United States Patent
Kirkwood

(10) Patent No.: US 7,080,707 B2
(45) Date of Patent: *Jul. 25, 2006

(54) TORQUE VECTORING DRIVE AXLE ASSEMBLY

(75) Inventor: Malcolm E. Kirkwood, Livonia, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/211,352

(22) Filed: Aug. 25, 2005

(65) Prior Publication Data

US 2005/0279558 A1 Dec. 22, 2005

Related U.S. Application Data

(63) Continuation of application No. 10/842,017, filed on May 7, 2004, now Pat. No. 6,962,227.

(51) Int. Cl.
*B60K 17/354* (2006.01)

(52) U.S. Cl. ............... 180/245; 180/249; 180/248; 475/221; 475/248; 475/229

(58) Field of Classification Search ............... 180/245
See application file for complete search history.

(56) References Cited

U.S. PATENT DOCUMENTS

| | | |
|---|---|---|
| 4,677,873 A | 7/1987 | Eastman et al. |
| 4,691,593 A | 9/1987 | Mueller |
| 4,757,728 A | 7/1988 | Pitsch |
| 4,763,747 A | 8/1988 | Muller |
| 5,046,998 A | 9/1991 | Frost |
| 5,057,062 A | 10/1991 | Yamasaki et al. |
| 5,078,660 A * | 1/1992 | Williams et al. ............... 475/84 |
| 5,370,588 A | 12/1994 | Sawase et al. |
| 5,415,598 A | 5/1995 | Sawase et al. |
| 5,456,641 A | 10/1995 | Sawase |
| 5,545,103 A | 8/1996 | Gustin |
| 5,632,185 A | 5/1997 | Gassmann |
| 5,662,543 A * | 9/1997 | Forsyth ....................... 475/198 |
| 5,699,888 A | 12/1997 | Showalter |
| 5,904,634 A | 5/1999 | Teraoka |
| 5,910,064 A | 6/1999 | Kuroki |
| 5,911,291 A | 6/1999 | Suetake et al. |

(Continued)

FOREIGN PATENT DOCUMENTS

WO WO 02/09966 A1 2/2002

*Primary Examiner*—Lesley D. Morris
*Assistant Examiner*—Marlon Arce-Diaz
(74) *Attorney, Agent, or Firm*—Harness, Dickey & Pierce P.L.C.

(57) ABSTRACT

A drive axle assembly includes a pair of axleshafts connected to a pair of wheels, and a drive mechanism for selectively coupling a driven input shaft to one or both of the axleshafts. The drive mechanism includes first and second drive units that can be selectively engaged to control the magnitude of the drive torque transferred and the relative rotary speed between the input shaft and the axleshafts. Each drive unit includes a planetary gearset disposed between the input shaft and its corresponding axleshaft, and a pair of mode clutches that may be activated to cause the planetary gearset to establish different speed ratio drive connections between the input shaft and the axleshaft. A control system including an electronic control unit (ECU) and sensors are provided to control actuation of the clutches so as to control the side-to-side traction characteristics of the drive axle assembly.

23 Claims, 6 Drawing Sheets

U.S. PATENT DOCUMENTS

| | | | |
|---|---|---|---|
| 5,989,146 A * | 11/1999 | Brown et al. ................ 475/207 |
| 6,120,407 A | 9/2000 | Mimura |
| 6,378,677 B1 | 4/2002 | Kuroda et al. |
| 6,394,246 B1 | 5/2002 | Gassmann et al. |
| 6,520,880 B1 | 2/2003 | Fukushima et al. |
| 6,533,090 B1 | 3/2003 | Osborn et al. |
| 6,612,956 B1 * | 9/2003 | Fukuno et al. ............... 475/199 |
| 6,616,566 B1 | 9/2003 | Gorlich |
| 6,645,108 B1 | 11/2003 | Gradu |
| 6,685,594 B1 * | 2/2004 | Kanazawa .................. 475/249 |
| 6,805,651 B1 * | 10/2004 | Lipman ...................... 475/221 |
| 6,824,487 B1 * | 11/2004 | Williams et al. ............ 475/204 |
| 6,862,953 B1 * | 3/2005 | Fitzgerald et al. ........ 74/665 G |
| 2004/0023743 A1 | 2/2004 | Cook et al. |

* cited by examiner

| DRIVE MODE | FIRST MODE CLUTCH | SECOND MODE CLUTCH | THIRD MODE CLUTCH | FOURTH MODE CLUTCH |
|---|---|---|---|---|
| 1ST | LOCKED | RELEASED | RELEASED | RELEASED |
| 2ND | RELEASED | LOCKED | RELEASED | RELEASED |
| 3RD | LOCKED | RELEASED | RELEASED | LOCKED |
| 4TH | LOCKED | RELEASED | LOCKED | RELEASED |
| 5TH | RELEASED | LOCKED | RELEASED | LOCKED |
| 6TH | RELEASED | RELEASED | LOCKED | RELEASED |
| 7TH | RELEASED | LOCKED | RELEASED | LOCKED |
| 8TH | RELEASED | RELEASED | LOCKED | RELEASED |
| 9TH | RELEASED | RELEASED | RELEASED | RELEASED |

FIG. 5

TORQUE VECTORING DRIVE AXLE ASSEMBLY

CROSS-REFERENCE TO RELATED APPLICATIONS

This application is a continuation of U.S. patent application Ser. No. 10/842,017 filed May 7, 2004 now U.S. Pat. No. 6,962,227.

FIELD OF THE INVENTION

The present invention relates generally to axle assemblies for use in motor vehicles and, more specifically, to an axle assembly equipped with a torque vectoring drive mechanism and an active yaw control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typicaly, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw and stability control system.

To achieve this objective, the drive axle assembly of the present invention includes a pair of axleshafts connected to a pair of wheels, and a drive mechanism that is operable to selectively couple a driven input shaft to one or both of the axleshafts. In particular, the drive mechanism includes first and second drive units that can be selectively engaged to control the magnitude of the drive torque transferred and the relative rotary speed between the input shaft and the axleshafts. Each drive unit includes a planetary gearset that is operably disposed between the input shaft and its corresponding axleshaft, and a pair of mode clutches that may be activated to cause the planetary gearset to establish different speed ratio drive connections between the input shaft and the axleshaft. Each mode clutch includes a multi-plate clutch pack and a power-operated actuator to control the engagement force applied to the clutch pack. A control system including an electronic control unit (ECU) and sensors are provided to control actuation of the clutches so as to control the side-to-side traction characteristics of the drive axle assembly.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein:

FIG. 5 is a table listing the available operational drive modes established by the drive axle assembly of the present invention.

DETAILED DESCRIPTION OF THE PREFERRED EMBODIMENTS

Figure 1:
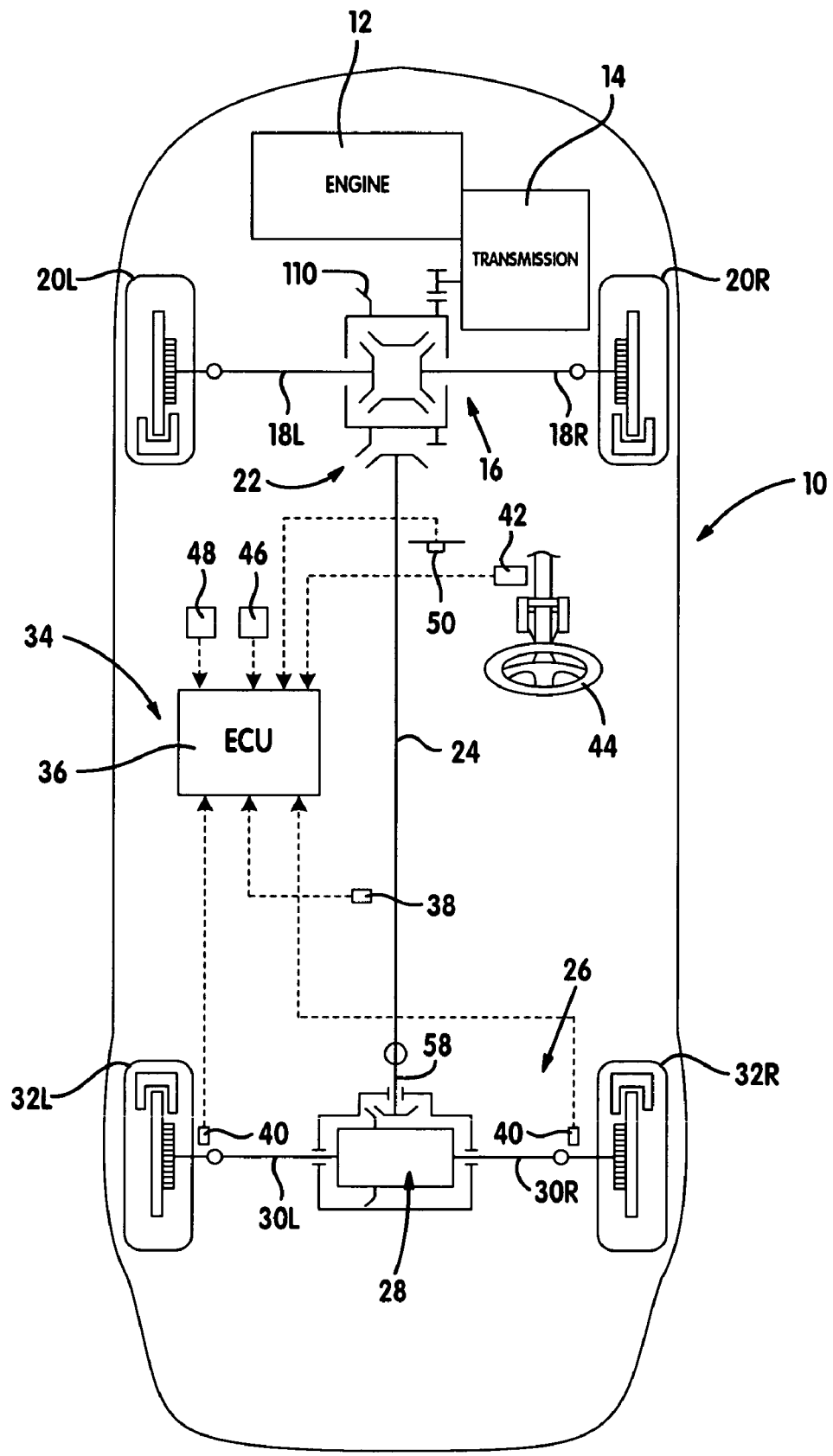
FIG. 1 is a diagrammatically illustration of a four-wheel drive motor vehicle equipped with the yaw and stability control system of the present invention.

Referring to FIG. 1, a four-wheel drive vehicle 10 includes an engine 12 horizontally mounted in a front portion of a vehicle body, a transmission 14 provided integrally with engine 12, a front differential 16 which connects transmission 14 to axle shafts 18L and 18R and left and right front wheels 20L and 20R, a power transfer unit ("PTU") 22 which connects front differential 16 to a propeller shaft 24, and a rear axle assembly 26 having a drive mechanism 28 which connects propeller shaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R. When the transmission of drive torque is cut off, vehicle 10 is brought into a front wheel drive (FWD) state in which only front wheels 20L and 20R are driven. In contrast, vehicle 10 is brought into a four-wheel drive (4WD) state wherein drive torque is transmitted to front wheels 20L and 20R and rear wheels 32L and 32R. Further, in the 4WD state, rear drive mechanism 28 is capable of varying the magnitude of drive torque to one or both of left and right rear wheels 32L and 32R to any extent.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propeller shaft 24, a pair of rear wheel speed sensors 40 are operable to detect the individual rear wheel speed values based rotation of left and right axle shafts 30L and 30R, and a steering angle sensor 42 is provided to detect a steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of left and right drive units 52L and 52R associated with drive mechanism 28 by utilizing a control strategy that is based on input signals from the various sensors and lock switch 50.

Drive mechanism 28 includes a casing 56 within which left drive unit 52L and right drive unit 52R are located. As seen, an input shaft 58 is connected to propshaft 24 and extends into and is rotatably supported by casing 56. Input shaft 58 includes a pinion gear 60 in constant mesh with a ring gear 62 that is fixed for rotation with a transfer shaft 64. Left drive unit 52L is operably arranged to selectively transfer drive torque from transfer shaft 64 to left axleshaft 30L. Likewise, right drive unit 52R is operably arranged to selectively transfer drive torque from transfer shaft 64 to right axleshaft 30R. Since the left and right drive units are substantially mirror-imaged arrangements, only the components of left drive unit 52L will be described in detail with it understood that the common components are identified using "L" and "R" suffixes to designate "left" and "right".

Figure 2:
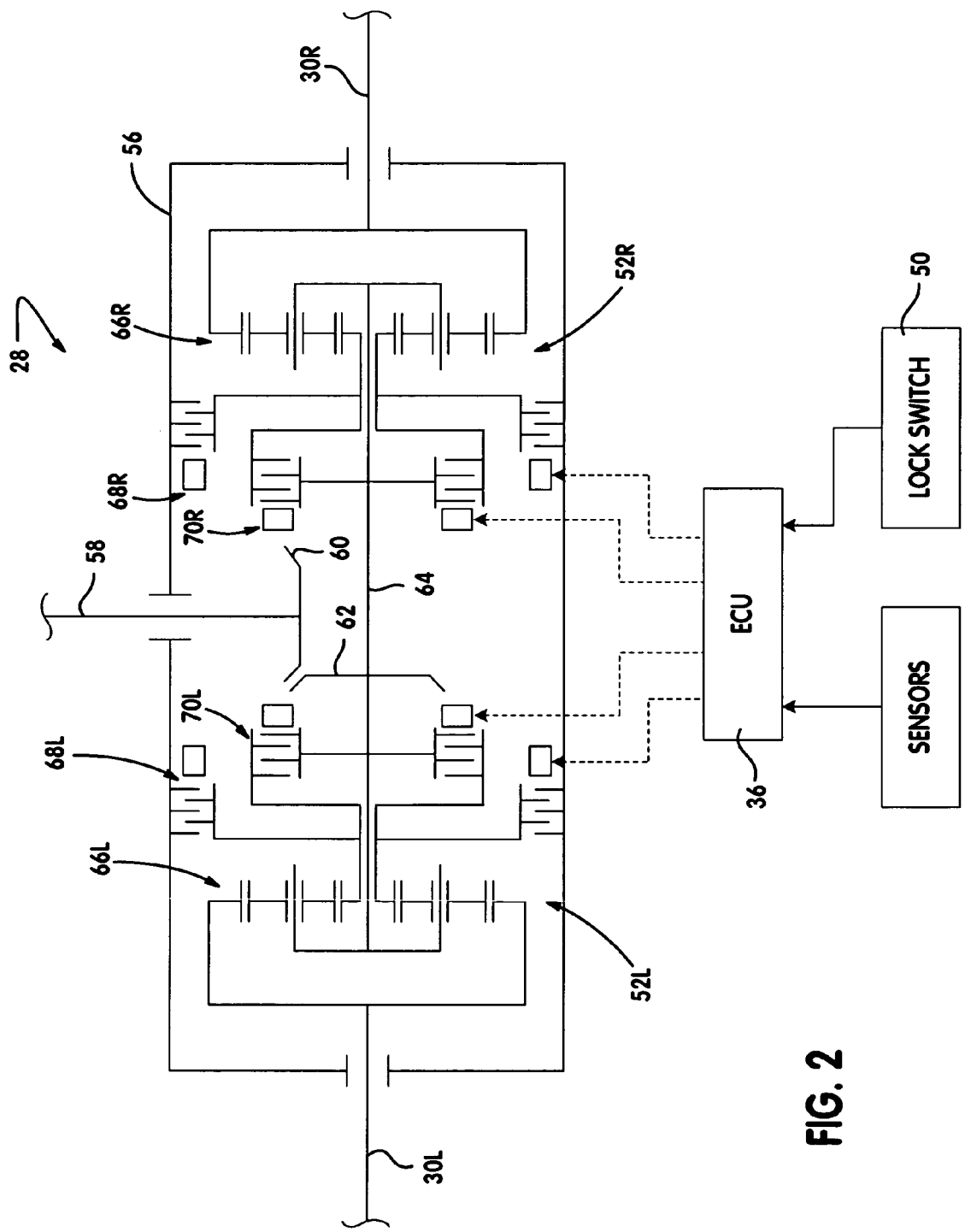
FIG. 2 is a schematic illustration of the drive axle assembly shown in FIG. 1 according to the present invention.
Figure 3A:
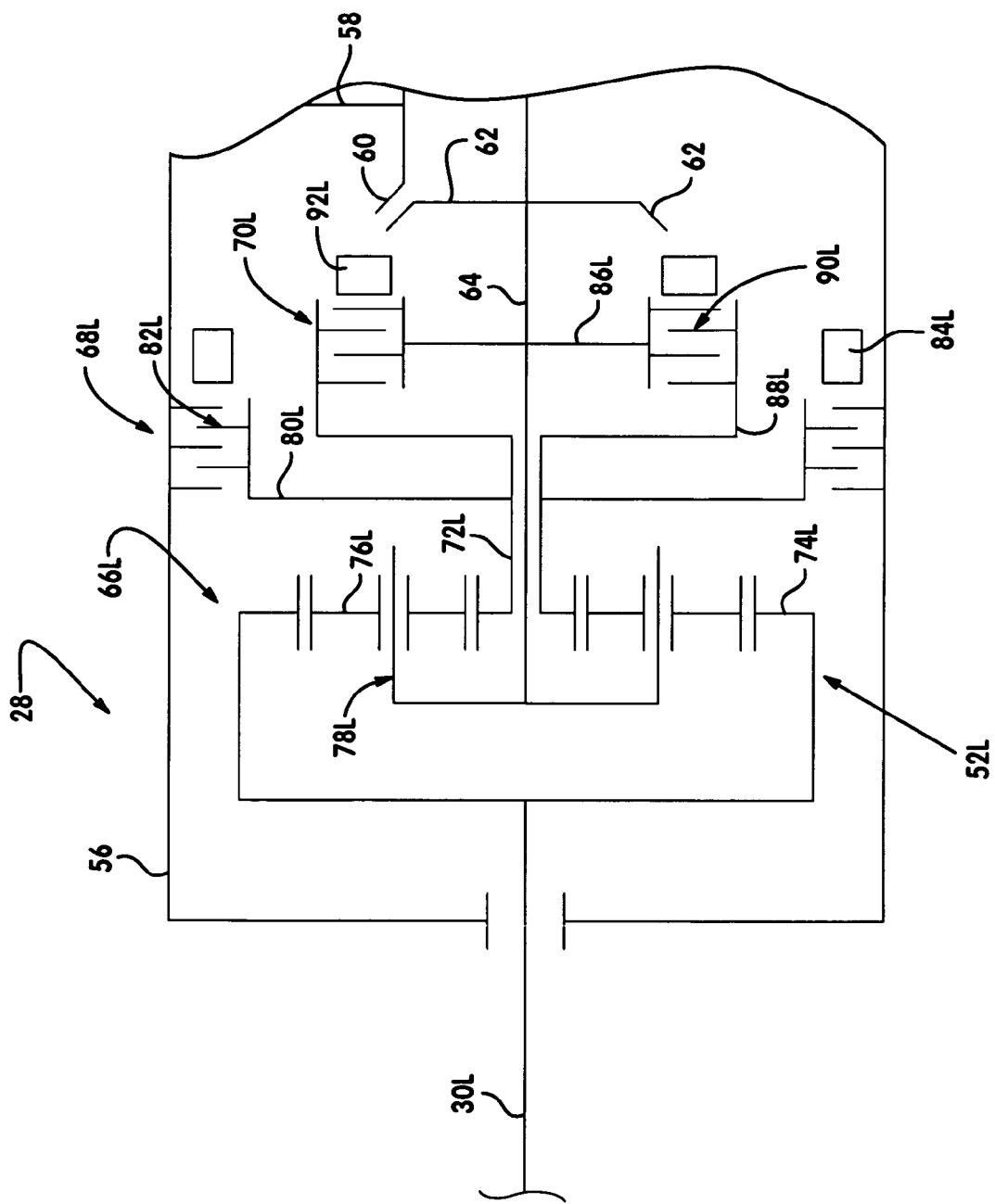
FIGS. 3A and 3B are enlarged portions of FIG. 2 showing the components of the left and right drive units associated with a torque vectoring drive mechanism that is integrated into the drive axle assembly.

Referring to FIGS. 2 and 3A, left drive unit 52L is shown to generally include a planetary gearset 66L, a first mode clutch 68L, and a second mode clutch 70L. Planetary gearset 66L has a sun gear 72L, a ring gear 74L, and a plurality of planet gears 76L meshed therewith which are rotatably supported from a planet carrier 78L. As seen, planet carrier 78L is fixed for rotation with transfer shaft 64 so as to act as the input member of gearset 66L while ring gear 74L is fixed for rotation with axleshaft 30L so as to act as the output member of gearset 66L.

First mode clutch 68L is operably arranged between sun gear 72L and casing 56 and acts as a brake device. First mode clutch 68L includes a clutch hub 80L fixed for rotation with sun gear 72L, a multi-plate clutch pack 82L disposed between hub 80L and casing 56, and a power-operated actuator 84L. First mode clutch 68L is operable in a first or "released" mode so as to permit unrestricted rotation of sun gear 72L such that no drive torque is transferred from transfer shaft 64 through gearset 66L to left axleshaft 30L. In contrast, first mode clutch 68L is also operable in a second or "locked" mode for preventing rotation of sun gear 72L such that left axleshaft 30L is overdriven relative to transfer shaft 64 at an increased speed ratio that is established by the meshed gear components of planetary gearset 66L. First mode clutch 68L is shifted between its released and locked modes via actuation of power-operated actuator 84L in response to control signals from ECU 36. In particular, first mode clutch 68L is operable in its released mode when power-operated actuator 84L applies a minimum clutch engagement force on clutch pack 82L and is further operable in its locked mode when actuator 84L applies a maximum clutch engagement force on clutch pack 82L.

Second mode clutch 70L is shown to be operably arranged between sun gear 72L and transfer shaft 64. Second mode clutch 70L includes a clutch hub 86L fixed for rotation with transfer shaft 64, a clutch drum 88L fixed for rotation with sun gear 72L, a multi-plate clutch pack 90L operably disposed between hub 86L and drum 88L, and a power-operated actuator 92L. Second mode clutch 70L is operable in a first or "released" mode to permit unrestricted rotation of sun gear 72L relative to transfer shaft 64 such that no drive torque is transferred from transfer shaft 64 through planetary gearset 66L to left axleshaft 30L. In contrast, second mode clutch 70L is also operable in a second or "locked" mode for preventing relative rotation between sun gear 72L and transfer shaft 64, thereby locking planetary gearset 66L and establishing a direct speed ratio drive connection between transfer shaft 64 and left axleshaft 30L. Second mode clutch 70L is also shifted between its released and locked modes via actuation of power-operated actuator 92L in response to control signals from ECU 36. Specifically, second mode clutch 70L is operable in its released mode when power-operated actuator 92L applies a minimum clutch engagement force on clutch pack 90L and is further operable in its locked mode when actuator 92L applies a maximum clutch engagement force on clutch pack 90L.

Figure 3B:
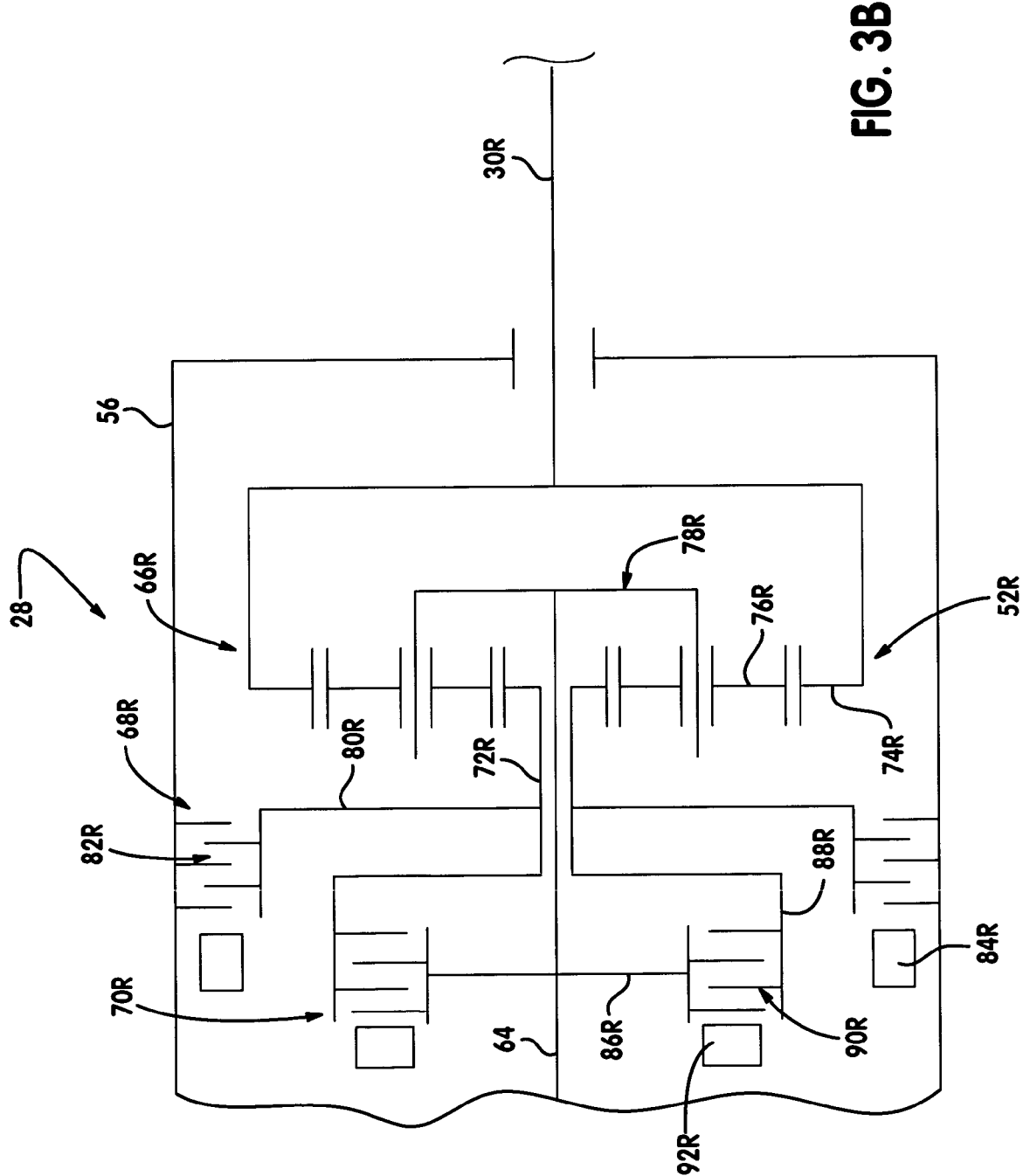

Referring to FIG. 3B, the components of right drive unit 52R are shown to basically be identical to those of left drive unit 52L and include a planetary gearset 66R, a third mode clutch 68R, and a fourth mode clutch 70R. Third mode clutch 68R includes a hub 80R fixed for rotation with sun gear 72R, a multi-plate clutch pack 82R, and a power-operated actuator 84R. Third mode clutch 68R is operable in a first or "released" mode to prevent unrestricted rotation of sun gear 72R such that no drive torque is transferred from transfer shaft 64 to right axleshaft 30R. In contrast, third mode clutch 68R is also operable in a second or "locked" mode for preventing rotation of sun gear 72R such that right axleshaft 30R is overdriven relative to transfer shaft 64 at an increased speed ratio established by gearset 66R. Power-operated actuator 84R is operable to shift third mode clutch 68R between its released and locked modes in response to control signals from ECU 36. in particular, third mode clutch 68R is operable in its released mode when clutch actuator 84R applies a minimum clutch engagement force on clutch pack 82R and is further operable in its locked mode when clutch actuator 84R applies a maximum clutch engagement force on clutch pack 82R.

Fourth mode clutch 70R is operably arranged between sun gear 72R and transfer shaft 64 and includes a hub 86R driven by transfer shaft 64, a drum 88R fixed for rotation with sun gear 72R, a clutch pack 90R, and a power-operated actuator 92R. Fourth mode clutch 70R is operable in a first or "released" mode to permit unrestricted rotation of sun gear 72R relative to transfer shaft 64 such that no drive torque is transmitted from transfer shaft 64 to right axleshaft 30R through planetary gearset 66R. In contrast, fourth mode clutch 70R is operable in a second or "locked" mode for preventing relative rotation between sun gear 72R and transfer shaft 64, thereby locking gearset 66R and establishing a direct speed ratio drive connection between transfer shaft 64 and right axleshaft 30R. Fourth mode clutch 70R is also shifted between its released and locked modes via actuation of power-operated actuator 92R in response to control signals from ECU 36. Specifically, fourth mode clutch 70R is operable in its released mode when power-operated actuator 92R applies a minimum clutch engagement force on clutch pack 90R and is further operable in its locked mode when actuator 92R applies a maximum clutch engagement force on clutch pack 90R.

Figure 4:
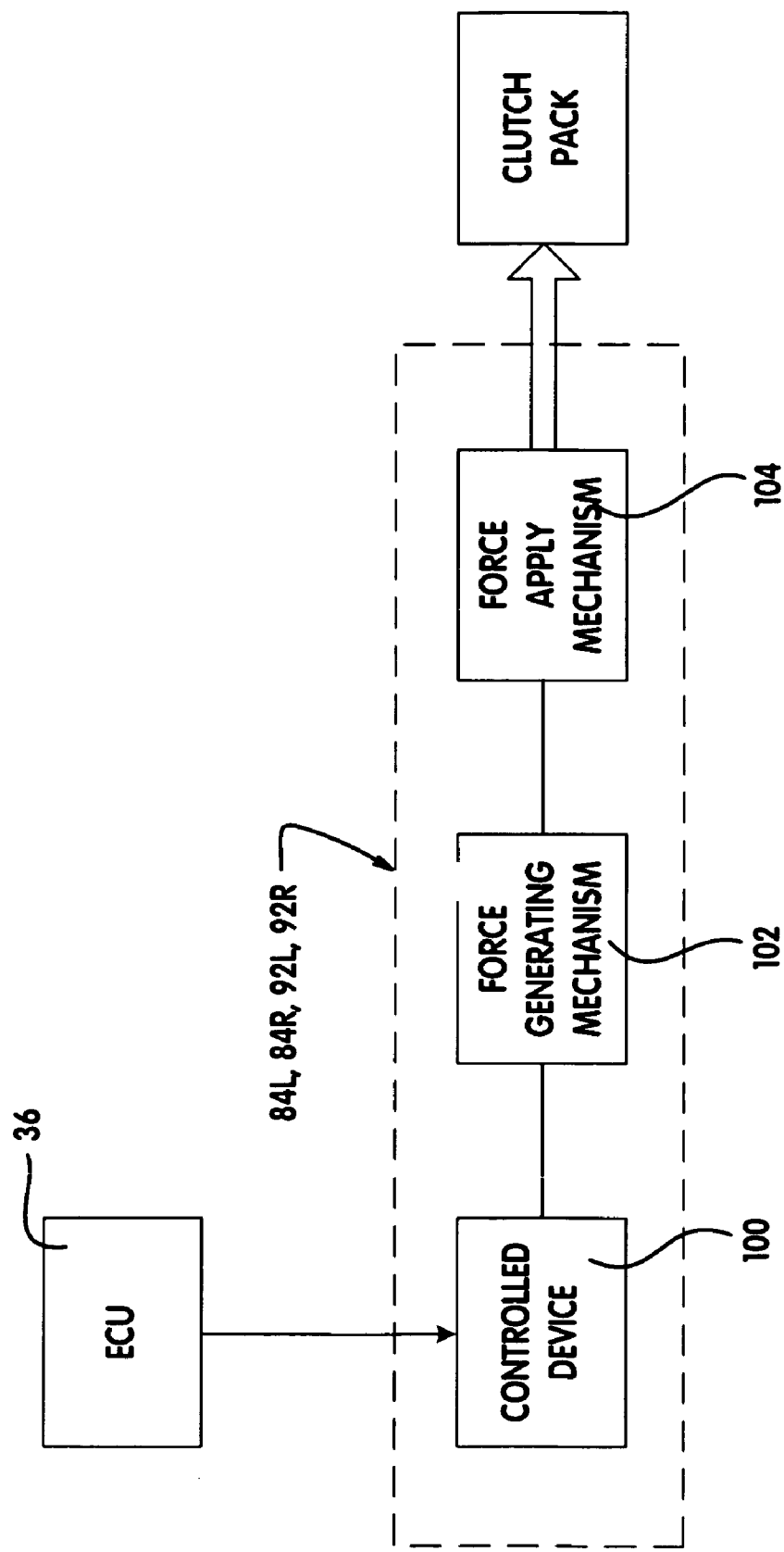
FIG. 4 is a diagrammatically illustration of a power-operated actuators associated with the drive units of the present invention.

As seen, power-operated actuators 84L, 84R, 92L and 92R are shown in schematic fashion to cumulatively represent the components required to accept a control signal from ECU 36 and generate a clutch engagement force to be applied to its corresponding clutch pack. To this end, FIG. 4 diagrammatically illustrates the basic components associated with such power-operated clutch actuators. Specifically, each power-operated actuator includes a controlled device 100, a force generating mechanism 102, and a force apply mechanism 104. In electro-mechanical systems, controlled device 100 would represent such components as, for example, an electric motor or an electromagnetic solenoid assembly capable of receiving an electric control signal from ECU 36. The output of controlled device 100 would drive a force generating mechanism 102 comprised of, for example, a ball ramp, a ball screw, a leadscrew, a pivotal lever arm, cam plates, etc., capable of converting the output into a clutch engagement force. Finally, force apply mechanism 104 functions to transmit and exert the clutch engagement force generated by force generating mechanism 102 onto the clutch pack and can include, for example, an apply plate or a thrust plate. If a hydra-mechanical system is used, controlled device 100 would be a flow or pressure control valve operable for delivering pressurized fluid from a fluid source to a piston chamber. A piston disposed for movement in the piston chamber would act as force generating mechanism 102. Preferably, controlled device 100 is also capable of receiving variable electric control signals from ECU 36 for permitting modulation of the magnitude of the clutch engagement force generated and applied to the clutch packs so as to permit "adaptive" control of the mode clutches.

In accordance with the arrangement shown, drive mechanism 28 is operable in coordination with yaw control system 34 to establish at a least nine distinct operative modes for controlling the transfer of drive torque from input shaft 58 to axleshafts 30L and 30R. To this end, each of the nine distinct operative modes will now be described, with the table provided in FIG. 5 depicting the operational status of each of the mode clutches required to establish each drive mode.

A first operative drive mode is established when first mode clutch 68L is in its locked mode and each of the second, third and fourth mode clutches are in their released mode. As such, right drive unit 52R is disconnected such that no drive torque is delivered from transfer shaft 64 to right axleshaft 30R while left drive unit 52L causes left axleshaft 30L to be overdriven relative to transfer shaft 64. When this drive mode is selected, right rear wheel 32R is free to rotate relative to left rear wheel 32L which, in turn, is being overdriven in relation to transfer shaft 64.

A second operative drive mode is established with second mode clutch 70L in its locked state and all of the other mode clutches in their released modes. In this drive mode, left drive unit 52L causes left axleshaft 30L to be commonly driven at a direct speed ratio with transfer shaft 64 while right drive unit 52R is disconnected such that no drive torque is transmitted from transfer shaft 64 to right axleshaft 30R. This drive mode is similar to the first drive mode except that left rear wheel 32L is being directly driven instead of overdriven relative to the rotary speed of transfer shaft 64.

A third operative drive mode is established when first mode clutch 68L and fourth mode clutch 70R are shifted into their locked modes while second mode clutch 70L and third mode clutch 68R are shifted into their released modes. In this third drive mode, left drive unit 52L functions to overdrive left axleshaft 30L relative to transfer shaft 64 while right drive unit 52R couples right axleshaft 30R for common rotation with transfer shaft 64. Thus, unequal drive torque is being delivered to rear wheels 32L and 32R with left rear wheel 32L being overdriven relative to right rear wheel 32R.

To establish the fourth operative drive mode, first mode clutch 68L and third mode clutch 68R are shifted into their locked modes while second mode clutch 70L and fourth mode clutch 70R are shifted into their released modes. In this fourth drive mode, both drive units are engaged such that each gearset 66L and 66R functions to overdrive its corresponding axleshaft 30L and 30R relative to the rotary speed of transfer shaft 64. In essence, this mode establishes a locked four-wheel overdrive mode since rear wheels 32L and 32R are being overdriven relative to front wheels 20L and 20R. Preferably, the gear ratios established by gearsets 66L and 66R are identical.

To establish the fifth operative drive mode, second mode clutch 70L and fourth mode clutch 70R are shifted into their locked modes while first and third mode clutches 68L and 68R are shifted into their released modes. In this fifth drive mode, left drive unit 52L couples left axleshaft 30L for common rotation with transfer shaft 64 while right drive unit 52R similarly couples right axleshaft 30R for common rotation with transfer shaft 64. As such, a locked four-wheel direct drive mode is established since rear wheels 32L and 32R are commonly driven.

The sixth operative drive mode is established with third mode clutch 68R shifted into its locked mode while all of the other mode clutches are shifted into their released modes. As such, left drive unit 52L is disconnected such that no drive torque is transferred to left axleshaft 30L while right drive unit 52R functions to overdrive axleshaft 30R relative to transfer shaft 64.

The seventh operative drive mode is established when fourth mode clutch 70R is locked and all of the other mode clutches are released. As such, right drive unit 52R functions to couple axleshaft 30R for direct rotation with transfer shaft 64 while left drive unit 52L is disconnected such that no drive torque is transmitted to left axleshaft 30L.

The eight drive mode is established when second mode clutch 70L and third mode clutch 68R are locked and first mode clutch 68L and fourth mode clutch 70R are released. Thus, right drive unit 52R functions to overdrive right axleshaft 30R while left drive unit 52L drives left axleshaft 30L at the same rotary speed as transfer shaft 64.

The ninth drive mode establishes an "open" differential mode wherein all four of the mode clutches are in their released mode such that no drive torque is transferred from input shaft 50 to either of axleshafts 30L and 30R so as to permit unrestricted relative rotation between rear wheels 32L and 32R with no drive torque delivered thereto.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58. Typically, drive units 52L and 52R would be non-engaged such that no drive torque is transmitted from driven transfer shaft 64 to either of rear wheels 32L and 32R. However, upon detection of lost traction at front wheels 20L and 20R, drive units 52L and 52R can be engaged to provide drive torque to rear wheels 32L and 32R based on the tractive needs of the vehicles.

In addition to on-off control of the mode clutches to establish the various drive modes associated with direct or overdrive connections through the planetary gearsets, it is further contemplated that variable clutch engagement forces can be generated by the power-operated actuators to adaptively control left-to-right speed and torque characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of the mode clutches also permits adaptive regulation of the side-to-side torque and speed characteristics if one of the distinct drive modes is not adequate to accommodate the current steer tractive condition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
   a powertrain operable for generating drive torque;
   a driveline for transmitting drive torque from said powertrain to first and second wheels, said driveline including a first shaft driving said first wheel, a second shaft driving said second wheel and a drive mechanism having a third shaft driven by said powertrain, a first drive unit disposed between said third shaft and said first shaft, and a second drive unit disposed between said third shaft and said second shaft, said first drive unit having a first gearset operably connecting said third shaft to said first shaft, a first mode clutch operable to cause said first gearset to establish a first ratio drive connection between said third shaft and said first shaft, and a second mode clutch operable to cause said first gearset to establish a second ratio drive connection between said third shaft and said first shaft, said second drive unit having a second gearset operably connecting said third shaft to said second shaft, a third mode clutch operable to cause said second gearset to establish a third ratio drive connection between said third shaft and said second shaft, and a fourth mode clutch operable to cause said second gearset to establish a fourth ratio drive connection between said third shaft and said second shaft; and
   a control system for controlling actuation of said mode clutches.

2. The motor vehicle of claim 1 wherein said drive mechanism is operable to establish a first overdrive mode when said first mode clutch is engaged and each of said second, third and fourth mode clutches are released such that said first shaft is overdriven relative to said third shaft and said second shaft is uncoupled from driven connection with said third shaft.

3. The motor vehicle of claim 2 wherein said drive mechanism is operable to establish a second overdrive mode when said third mode clutch is engaged and each of said first, second and fourth mode clutches are released such that said second shaft is overdriven relative to said third shaft and said first shaft is uncoupled from driven connection with said third shaft.

4. The motor vehicle of claim 3 wherein said drive mechanism is operable to establish a third overdrive mode when said first and third mode clutches are engaged and said second and fourth mode clutches are released such that both of said first and second shafts are overdriven relative to said third shaft.

5. The motor vehicle of claim 1 wherein said drive mechanism is operable to establish a first drive mode when said second mode clutch is engaged and each of said first, third and fourth mode clutches are released such that said first shaft is driven by said third shaft while said second shaft is uncoupled from driven connection to said third shaft.

6. The motor vehicle of claim 5 wherein said drive mechanism is operable to establish a second drive mode when said fourth mode clutch is engaged and each of said first, second and third mode clutches are released such that said second shaft is driven relative to said third shaft while said first shaft is uncoupled from driven connection with said third shaft.

7. The motor vehicle of claim 6 wherein said drive mechanism is operable to establish a third drive mode when said second and fourth mode clutches are engaged and said first and third mode clutches are released such that both of said first and second shafts are driven by said third shaft.

8. The motor vehicle of claim wherein said first gearset includes a first input member coupled to said third shaft and a first output member coupled to said first shaft, wherein said first mode clutch is operable to engage said first gearset such that said first output member is driven at a rotary speed different than the rotary speed of said first input member to establish said first ratio drive connection, and wherein said second mode clutch is operable to engage said first gearset such that said first output member is driven the same rotary speed as said first input member to establish said second ratio drive connection.

9. The motor vehicle of claim 8 wherein said second gearset includes a second input member coupled to said third shaft and a second output member coupled to said second shaft, wherein said third mode clutch is operable to engage said second gearset such that said second output member is driven at a rotary speed different than the rotary speed of said second input member to establish said third ratio drive connection, and wherein said fourth mode clutch is operable to engage said first gearset such that said second output member is driven the same rotary speed as said second input member to establish said fourth ratio drive connection.

10. A drive axle assembly for use in a motor vehicle having a powertrain and a first and second wheels, comprising:
    an input shaft driven by the powertrain;
    a first axleshaft driving the first wheel;
    a second axleshaft driving the second wheel;
    a transfer shaft driven by said input shaft;

a first drive unit having a first gearset interconnecting said transfer shaft to said first axleshaft, a first mode clutch operable to cause said first gearset to establish a first ratio drive connection between said transfer shaft and said first axleshaft and a second mode clutch operable to cause said first gearset to establish a second ratio drive connection therebetween;

a second drive unit having a second gearset interconnecting said transfer shaft to said second axleshaft, a third mode clutch operable to cause said second gearset to establish a third ratio drive connection between said transfer shaft and said second axleshaft and a fourth mode clutch operable to cause said second gearset to establish a fourth ratio drive connection therebetween; and a control system for controlling actuation of said mode clutches.

11. The drive axle assembly of claim 10 wherein a first overdrive mode is established when said first mode clutch is engaged and each of said second, third and fourth mode clutches are released such that said first axleshaft is overdriven relative to said transfer shaft while said second axleshaft is released from driven connection with said transfer shaft.

12. The drive axle assembly of claim 11 wherein a second overdrive mode is established when said third mode clutch is engaged and each of said first, second and fourth mode clutches are released such that said second axleshaft is overdriven relative to said transfer shaft while said first axleshaft is released from driven connection with said transfer shaft.

13. The drive axle assembly of claim 12 wherein a third overdrive mode is established when said first and third mode clutches are engaged and said second and fourth mode clutches are released such that both of said first and second axleshafts are overdriven relative to said transfer shaft.

14. The drive axle assembly of claim 10 wherein a first drive mode is established when said second mode clutch is engaged and each of said first, third and fourth mode clutches are released such that said first axleshaft is driven by said transfer shaft while said second axleshaft is released from driven connection to said transfer shaft.

15. The drive axle assembly of claim 14 wherein a second drive mode is established when said fourth mode clutch is engaged and each of said first, second and third mode clutches are released such that said second axleshaft is driven relative to said transfer shaft while said first axleshaft is released from driven connection with said transfer shaft.

16. The drive axle assembly of claim 13 wherein a third drive mode is established when said second and fourth mode clutches are engaged and said first and third mode clutches are released such that both of said first and second axleshafts are driven by said transfer shaft.

17. The drive axle assembly of claim 10 wherein said first gearset includes a first input member coupled to said transfer shaft and a first output member coupled to said first axleshaft, wherein said first mode clutch is operable to engage said first gearset such that said first output member is driven at a rotary speed different than the rotary speed of said first input member to establish said first ratio drive connection, and wherein said second mode clutch is operable to engage said first gearset such that said first output member is driven the same rotary speed as said first input member to establish said second ratio drive connection.

18. The drive axle assembly of claim 17 wherein said second gearset includes a second input member coupled to said transfer shaft and a second output member coupled to said second axleshaft, wherein said third mode clutch is operable to engage said second gearset such that said second output member is driven at a rotary speed different than the rotary speed of said second input member to establish said third ratio drive connection, and wherein said fourth mode clutch is operable to engage said second gearset such that said second output member is driven the same rotary speed as said second input member to establish said fourth ratio drive connection.

19. A drive axle assembly for use in a motor vehicle having a powertrain a first and second wheels, comprising:

a first axles haft connected to the first wheel;

a second axleshaft connected to the second wheel;

a drive shaft driven by the powertrain; and a drive mechanism operable to selectively couple said drive shaft to said first and second axleshafts, said drive mechanism including first and second drive units that can be selectively engaged to control the transfer of drive torque and the relative rotary speed between said drive shaft and said first and second axleshafts, wherein said first drive unite includes a first gearset operably disposed between said drive shaft and said first axleshaft and first and second mode clutches, said first and second mode clutches are selectively actuatable to cause said first gearset to establish different speed ratio drive connections between said drive shaft and said first axleshaft, and wherein said second drive unit includes a second gearset operably disposed between said drive shaft and said second axleshaft and third and fourth mode clutches, said third and fourth mode clutches are selectively actuatable to cause said second gearset to establish different speed ratio drive connections between said drive shaft and said second axleshaft.

20. A motor vehicle, comprising:

a powertrain operable for generating drive torque;

a driveline for selectively transmitting drive torque from said powertrain to first and second wheels, said driveline including an input shaft driven by said powertrain, a first axleshaft driving said first wheel, a second axleshaft driving said second wheel and a drive mechanism for selectively transmitting drive torque from said input shaft to said first and second axleshafts, said drive mechanism including a transfer shaft driven by said input shaft and first and second drive units operably disposed between said transfer shaft and said first and second axleshafts, said first drive unit including a first gearset and first and second mode clutches, said first gearset having a first input member driven by said transfer shaft, a first reaction member and a first output member driving said first axleshaft, said first mode clutch is operable to selectively brake rotation of said first reaction member and said second mode clutch is operable to selectively couple said first reaction member for rotation with said first input member, said second drive unit including a second gearset and third and fourth mode clutches, said second gearset having a second input member driven by said transfer shaft, a second reaction member and a second output member driving said second axleshaft, said third mode clutch is operable to selectively brake rotation of said second reaction member and said fourth mode clutch is operable to selectively couple said second reaction member for rotation with said second input member; and a control system for controlling actuation of said mode clutches.

21. A drive axle assembly for use in a motor vehicle having a powertrain and a first and second wheels, comprising:
- a transfer shaft driven by the powertrain;
- a first axleshaft driving the first wheel;
- a second axleshaft driving the second wheel;
- a first drive unit having a first gearset interconnecting said transfer shaft to said first axleshaft, a first mode clutch operable to cause said first gearset to establish a first ratio drive connection between said transfer shaft and said first axleshaft and a second mode clutch operable to cause said first gearset to establish a second ratio drive connection therebetween;
- a second drive unit having a second gearset interconnecting said transfer shaft to said second axleshaft, a third mode clutch operable to cause said second gearset to establish a third ratio drive connection between said transfer shaft and said second axleshaft and a fourth mode clutch operable to cause said second gearset to establish a fourth ratio drive connection therebetween; and
- a control system for controlling actuation of said mode clutches.

22. The drive axle assembly of 21 wherein said first gearset includes a first input member coupled to said transfer shaft and a first output member coupled to said first axleshaft, wherein said first mode clutch is operable to engage said first gearset such that said first output member is driven at a rotary speed different than the rotary speed of said first input member to establish said first ratio drive connection, and wherein said second mode clutch is operable to engage said first gearset such that said first output member is driven the same rotary speed as said first input member to establish said second ratio drive connection.

23. The drive axle assembly of claim 22 wherein said second gearset includes a second input member coupled to said transfer shaft and a second output member coupled to said second axleshaft, wherein said third mode clutch is operable to engage said second gearset such that said second output member is driven at a rotary speed different than the rotary speed of said second input member to establish said third ratio drive connection, and wherein said fourth mode clutch is operable to engage said second gearset such that said second output member is driven the same rotary speed as said second input member to establish said fourth ratio drive connection.

* * * * *